Concurrent Catalyst Flow in heat exchange with countercurrent fluid flow for temperature control.

Inventor:
William B. Plummer
By Donald E. Payne Attorney

Patented July 8, 1941

2,248,196

UNITED STATES PATENT OFFICE 2,248,196

CATALYTIC CRACKING AND REFORMING

William B. Plummer, Chicago, Ill., assignor to Standard Oil Company, Chicago, Ill., a corporation of Indiana Application September 13, 1939, Serial No. 294,774

11 Claims. (Cl. 196—52)

This invention relates to catalytic cracking and reforming apparatus and processes and it pertains more particularly to an improved method and means for utilizing exothermic heat of catalyst regeneration for supplying the endothermic heat of reforming or cracking in a continuous powdered or moving bed catalyst system.

An object of the invention is to provide a method and means for supplying endothermic heat of cracking or reforming at the particular points in the conversion system wherein such heat is most needed. A further object is to provide a method and means for supplying the heat of conversion by the exothermic heat liberated by the oxidation of carbonaceous materials on catalyst which is undergoing regeneration.

A further object is to increase the efficiency of hydrocarbon conversion processes, particularly those processes which are operated in a continuous manner, with either concurrent or countercurrent catalyst flow but with the gaseous charge flowing countercurrent to regeneration gases. Other objects will be apparent as the detailed description of the invention proceeds.

In practicing the invention I provide catalytic cracking or reforming apparatus with certain conduits in heat exchange relationship with each other and so positioned that the heat liberated in one conduit may be utilized in the other. As gas oil or naphtha vapors move through a conversion process of the cracking or reforming type the temperature of said vapors becomes lower and lower, due to the endothermic heat of the conversion reaction. When catalyst is regenerated most of the exothermic heat of regeneration is liberated during the initial stage of said regeneration and as this stage is passed the temperature in the regeneration system becomes gradually lower and lower. In practicing my invention I position the cracking chamber or conduit in heat exchange relationship with the regeneration chamber or conduit and direct the flow of charge and regeneration gases in both conduits so that the hottest end of the conversion chamber is in thermal contact with the coolest end of the regeneration chamber and the hottest end of the regeneration chamber is in thermal contact with the coolest end of the conversion chamber. Thus I effect a stabilization of the temperature in both the conversion and regeneration systems, I prevent overheating of the catalyst during regeneration and I utilize the heat of regeneration for supplying a part of the necessary heat of catalytic cracking or catalytic reforming.

Figure 1:
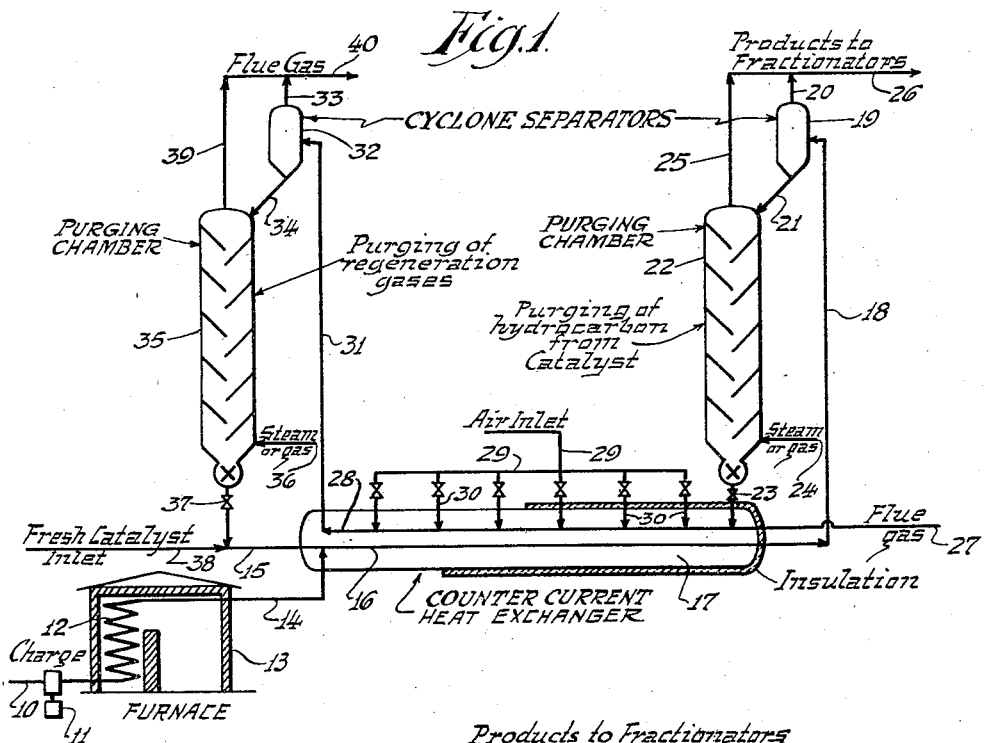
Figure 2:
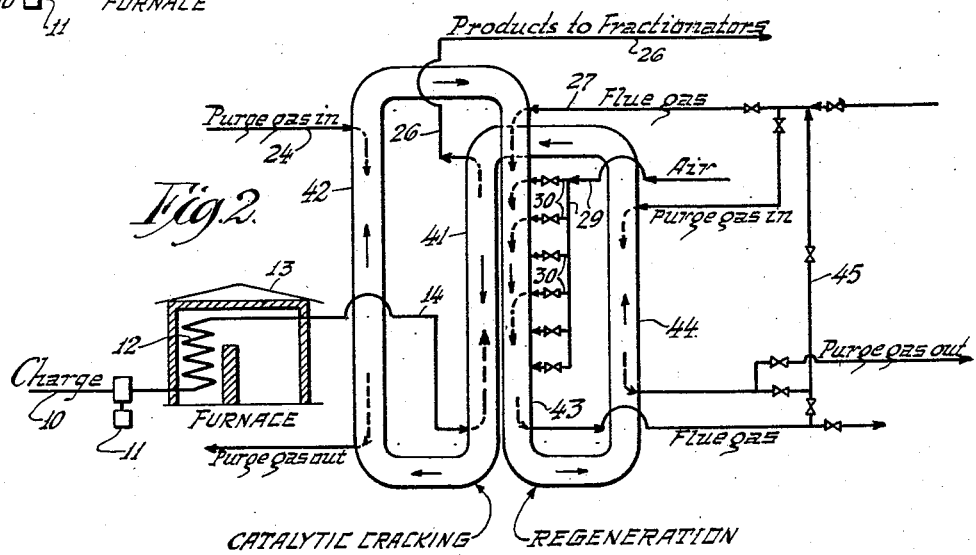

The invention will be more clearly understood from the following detailed description and from the accompanying drawing wherein similar parts are designated by like reference characters, and wherein Figure 1 is a flow diagram of a conversion system employing powdered catalyst; and Figure 2 is a flow diagram of a conversion system employing a catalyst in a moving bed.

While my invention is applicable to all hydrocarbon conversion processes of the type wherein an endothermic catalytic reaction is supplemented by an exothermic catalyst regeneration step, i. e. such processes as cracking, reforming, aromatization, desulfurization, dehydrogenation, isomerization, etc., it is particularly applicable to catalytic cracking and reforming (including dehydrogenation and aromatization) and it will be described in connection with catalytic cracking systems. The charge for such systems may be gas oil or other vaporizable hydrocarbon material whether derived from petroleum, shale, carbonaceous materials, carbon monoxide-hydrogen synthesis, etc. In a preferred example the charging stock is a Mid-Continent or East Texas gas oil.

Referring to Figure 1, the gas oil charge is introduced through line 10 by pump 11 into coils 12 of furnace 13 wherein the charge is vaporized and heated to a temperature of about 800 to 1000° F., preferably about 850 to 950° F. under a pressure which may range from atmospheric to about 150 pounds per square inch, preferably about 50 pounds per square inch. Into the hot vapors in transfer line 14 powdered catalyst is injected through line 15, the catalyst material being suspended in the vapors and carried therewith through conduit 16 in externally insulated conversion zone 17.

The catalyst may be of the clay type, i. e. activated fuller's earth or selected activated or acid treated clays. Alternatively, the catalyst may be of the silica-alumina type prepared by impregnating silica gel with alumina. Catalysts of these types are well known in the art and a detailed description of their composition and method of preparation is therefore unnecessary. It should be understood, however, that I contemplate the use of any known catalyst material, particularly of the clay type or the silica-alumina type wherein metal oxides are adsorbed on, incorporated in or admixed with the clay or the gel. The catalyst should be in powdered form so that it may be suspended in gases or vapors and it is preferably admixed with small amounts of water or steam. It should be understood that instead of injecting the powdered catalyst through line 15 to reaction conduit 16 this catalyst may be introduced with the original charge as a slurry.

The catalyst to oil ratio may vary within considerable limits but I prefer to use from about 0.5 to 10.0, preferably about 2 or 4 volumes of catalyst per volume of liquid feed stock and I prefer to employ a feed rate of about ½ to 2 volumes of oil per reactor volume per hour (time of contact about 5 to 50 seconds). The reactor is preferably of relatively small cross-sectional area and relatively long in order that heat may be supplied thereto and in order that the catalyst may remain thoroughly dispersed in the vapor stream, as will be hereinafter pointed out.

The oil vapors with suspended catalyst from reactor 16 are passed through line 18 to cyclone separator 19 from which the hydrocarbon gases and vapors are taken overhead through line 20 and the catalyst is passed by line 21 to stripping or purging tower 22 which is preferably provided with inclined baffles. Steam flue gas, or preferably a hot hydrocarbon gas, is introduced at the base of tower 22 through line 24 and serves to strip out of the catalyst material all of the volatile hydrocarbons contained therein, these hydrocarbons being passed through line 25 and line 26 for recovery together with the products from separator 19.

When the catalyst material reaches the base of tower 22 it is substantially free from vaporizable hydrocarbons and is still at a temperature of about 750 to 850° F. This catalyst material is metered by catalyst valve or other suitable metering means 23 then picked up by flue gas, introduced through line 27 and carried through regeneration conduit 28 while suspended in said flue gas. The flue gas is preferably at a temperature of about 800 to 900° F. so that the catalyst material is at a temperature above the kindling point of the carbonaceous deposit on the catalyst. Air is introduced through header 29 and branch lines 30 into regeneration conduit 28 in such amounts that the carbonaceous material is burned from the catalyst without increasing the temperature of the catalyst higher than about 1050 to 1150° F.

At the first point of oxygen introduction, at the right end of the heat exchanger as shown in Figure 1 there will be a sharp rise in temperature due to the combustion of the carbonaceous material, and as the catalyst moves through conduit 28 the heat liberated by combustion becomes less and less since less carbonaceous material remains on the catalyst, the remaining carbonaceous material is more deeply imbedded in the catalyst, hence more difficult to burn, and since an excess of oxygen must be introduced to insure complete combustion.

The hottest part of regeneration conduit 28 is, therefore, adjacent the coolest part of reaction conduit 16. In conduit 16 the temperature gradually drops as the vapors with suspended catalyst move from left to right in Figure 1 due to the endothermic nature of the catalytic reaction. By placing conduits 16 and 28 in heat exchange relationship to each other and by maintaining the countercurrent flow as illustrated in Figure 1, I utilize the exothermic heat generated by regeneration to supply the endothermic heat required for catalytic conversion or, in other words, provide a substantially uniform or even an increasing temperature throughout the length of conversion conduit 16. An increase in temperature is desirable as the catalyst becomes more and more spent in order that maximum conversion per pass may be obtained. At the same time the heat absorbed by the conversion reaction in conduit 16 removes the excess heat generated in conduit 28 and thereby protects the catalyst which is undergoing regeneration against unduly high temperatures. The catalyst in conduit 28 is thus maintained constantly at a temperature above the kindling point of the carbonaceous material and by the time the catalyst reaches the end of conduit 28 it is substantially freed from such carbonaceous material.

The flue gases with suspended catalyst material are then passed through line 31 to cyclone separator 32 from which gases and vapors pass overhead through line 33 and catalyst is passed by line 34 to purging chamber 35 which may be similar in structure to chamber 22. Steam or flue gas may be introduced by line 36 for removing all oxygen and oxygen-containing gases from the catalyst before it is returned by catalyst pump 37 to line 15 for further injection into reaction conduit 16. Fresh catalyst may be introduced as required through line 38. The flue gases from the top of chamber 35 may be withdrawn through line 39 and line 40 in admixture with gases from line 33. These gases when sufficiently free of oxygen may be recycled to line 27 for suspending further catalyst material which is to undergo regeneration.

While I have described the use of a continuous catalytic conversion system employing powdered catalyst and countercurrent heat exchange between conversion and regeneration reactors it should be understood that the invention is also applicable to concurrent heat exchange and to other types of conduits particularly to moving catalyst bed systems. An example of such system is illustrated in Figure 2 wherein a granular or pelleted catalyst passes through an endless circuit involving conversion, purging, regeneration, purging, conversion, etc. In such systems the catalyst material is preferably retained in vertical tubes which are provided at their tops and bottoms with suitable vapor seals. The catalyst leaving the bottom of each tube is picked up in a closed conveyor and returned to the top of the other tube, preferably being purged from hydrocarbons or oxygen, as the case may be, in the conveyor zone.

Thus in Figure 2, wherein catalyst flow is indicated by solid arrows and fluid flow is indicated by dotted arrows, cracking reactor 41 remains constantly filled with granular or pelleted catalyst material which is continuously or intermittently withdrawn through conveyor and purging system 42 to regeneration system 43 while regenerated catalyst from the bottom of 43 is continuously purged in conveyor 44 for replenishing the catalyst material in reactor 41. It should be understood, of course, that any catalyst losses incurred in the purging and regeneration steps may be supplied by suitable means (not shown); also it will be understood that various arrangements of feed hoppers may be used above and below reactors 41 and 43 with valves so arranged as to insure against leakage of purge gases into the conversion or regeneration zones and to insure against leakage of conversion products into the purging zones.

The hot gas oil vapors from transfer line 14 may be introduced at the base of reactor 41 and the conversion products may be withdrawn from the top of this reactor through line 26 which leads to the product fractionation system. Air for regeneration is introduced through manifold 29 and branched lines 30 which are spaced along regeneration reactor 43, the regeneration gases being withdrawn from the lower part of said reactor through the flue gas line. A part of these regeneration gases may, of course, be recycled through line 45 to the flue gas inlet 27.

In the system shown in Figure 2 it will be observed that the hottest part of reactor 41 is at the bottom, i. e. the point of fresh feed inlet, since the temperature will gradually drop due to the endothermic heat of the reaction. On the other hand, the hottest part of regeneration reactor 43 is at the top wherein the purged spent catalyst first comes in contact with the oxidizing gas. Thus, by maintaining reactors 41 and 43 in intimate thermal contact, preferably in a heat insulated chamber, the exothermic heat of catalyst regeneration supplies the endothermic heat of cracking in the upper part of reactor 41, while the temperatures in both reactors are maintained substantially constant, thus avoiding overheating of catalyst during regeneration and insuring maximum conversions per pass. Instead of concurrent flow of gases and catalyst in the regeneration chamber I may employ countercurrent flow and introduce flue gases through line 40 and discharge them through line 27. Even with such a flow arrangement the hottest part of the regeneration zone will be near the inlet of spent catalyst to be regenerated, i. e. at the upper part of the regeneration reactor. Irrespective therefore, of the direction of catalyst and fluid flow in the tubes I maintain the hottest part of the regeneration chamber in contact with the coolest part of the conversion chamber and the hottest part of the conversion chamber in contact with the coolest part of the regeneration chamber.

While I have described in detail two preferred embodiments of my invention it should be understood that I do not limit myself to any of the details hereinabove set forth except as defined by the following claims.

I claim:

1. In an endothermic hydrocarbon conversion process employing a catalyst material which requires regeneration by exothermic combustion with oxygen, the method of obtaining maximum conversions per pass with a minimum catalyst deterioration which comprises successively moving catalyst through an elongated reaction zone and an elongated regeneration zone, continuously contacting catalyst material with a hydrocarbon undergoing conversion in said elongated reaction zone, whereby spent catalyst is obtained, continuously oxidizing carbonaceous material from said spent catalyst in said elongated regeneration zone, maintaining said reaction zone and said regeneration zone in thermal heat exchange relationship with each other, and adjusting the flow of materials in said zones so that the hot end of the elongated regeneration zone is adjacent the cool end of the reaction zone.

2. The method of claim 1 wherein the catalyst movement in the regeneration zone is countercurrent to the catalyst movement in the reaction zone.

3. The method of claim 1 wherein the catalyst movement in the regeneration zone is concurrent to the catalyst movement in the reaction zone.

4. In an endothermic hydrocarbon conversion process wherein catalyst becomes spent in an elongated reaction zone and is thereafter regenerated in an elongated regeneration zone for reuse, the method of supplying endothermic heat of conversion to the elongated reaction zone which comprises passing the spent catalyst material through said regeneration zone, maintaining said regeneration zone in heat exchange relationship to said reaction zone, and introducing oxidizing gas into said regeneration zone adjacent the cooler end of the reaction zone whereby the exothermic heat of regeneration is continuously liberated to supply the endothermic heat of conversion.

5. In an endothermic hydrocarbon conversion process wherein catalyst becomes spent in an elongated reaction zone and is thereafter regenerated in an elongated regeneration zone for reuse, the method of supplying endothermic heat of conversion to said elongated reaction zone which comprises passing spent catalyst material through said regeneration zone, maintaining said regeneration zone in heat exchange relationship to the reaction zone, passing the catalyst in the regeneration zone in the same direction as the catalyst is passed in the reaction zone, passing gases and vapors in the reaction zone countercurrent to the flow of catalyst material therein and introducing an oxidizing gas into said regeneration zone at spaced points therein.

6. The method of claim 5 wherein gases flow concurrent with the catalyst in the regeneration zone.

7. In a continuous endothermic hydrocarbon conversion system wherein an elongated regeneration chamber is disposed in heat exchange relation to an elongated conversion chamber, the method of regulating and utilizing the heat of regeneration which comprises passing hydrocarbon vapors in a conversion zone countercurrent to regeneration gases in a regeneration zone whereby the high temperature end of the conversion zone is adjacent the low temperature end of the regeneration zone and the high temperature end of the regeneration zone is adjacent the low temperature end of the conversion zone.

8. In a hydrocarbon conversion system means for heating hydrocarbon vapors to reaction temperature in an elongated conversion chamber, means for passing the heated vapors through said conversion chamber in contact with the catalyst therein, means for purging the catalyst, an elongated regeneration chamber in heat exchange relation to said conversion chamber, means for passing purged catalyst into said regeneration chamber, means for introducing an oxidizing gas at a plurality of points along said regeneration chamber, at least one of said points being near the purged catalyst inlet end of the regeneration zone and longitudinally spaced from the zone at which heated vapors enter the conversion chamber, means for purging the catalyst leaving said regeneration chamber and means for returning said last-named purged catalyst to said conversion chamber.

9. A powdered catalyst system for converting hydrocarbons into high quality motor fuel which system comprises means for heating a charging stock to elevated temperatures, means for injecting powdered catalyst into said heated charging stock, an elongated reactor, means for passing the powdered catalyst suspended in heated hydrocarbon vapors through said reactor, means for separating catalyst from vapors after their passage through said reactor, means for suspending the catalyst in flue gas after it has been freed from hydrocarbon vapors, a regeneration reactor in heat exchange relation with said elongated reactor, means for passing the suspension of catalyst in flue gas through the regeneration reactor countercurrent to the flow of catalyst suspended in oil charge through the conversion reactor, means for introducing air at a plurality of points along said regeneration reactor, means for purging regenerated catalyst from regeneration gases and means for returning regenerated and purged catalyst for suspension in further amounts of further charging stock vapors.

10. In an endothermic catalytic hydrocarbon conversion process employing powdered catalyst which becomes spent in the endothermic conversion and which requires exothermic regeneration, the method of operation which comprises suspending powdered catalyst in a stream of superheated hydrocarbon vapors, passing said vapors together with the suspended powdered catalyst through an insulated conversion zone wherein carbonaceous material is deposited on said powdered catalyst, then separating said catalyst from hydrocarbon vapors, suspending said separated catalyst in a regeneration gas stream, passing said regeneration gas stream with its suspended catalyst through a regeneration zone in heat exchange relationship with said insulated reaction zone, introducing air into said regeneration zone for burning carbonaceous material from the powdered catalyst suspended therein whereby the exothermic heat resulting from said combustion supplies endothermic heat for said conversion, separating gases from the catalyst leaving said regeneration zone and admixing said powdered catalyst with further amounts of superheated hydrocarbon vapors for effecting further endothermic conversion.

11. The method of claim 10 wherein the endothermic conversion process is catalytic cracking with a charging stock comprising gas oil, wherein the temperature in the endothermic zone is about 800 to 1000° F. and the temperature in the exothermic regeneration zone is below about 1150° F. but higher than the temperature in the endothermic conversion zone and wherein about .5 to 10 volumes of powdered catalyst are introduced into the superheated vapor stream per volume of liquid charging stock.

WILLIAM B. PLUMMER.